INVENTOR.
JOHN C. RENFRO
BY
ATTORNEY

Nov. 3, 1970  J. C. RENFRO  3,537,836
OXIDIZER FOR MAKING HUMUS
Filed July 27, 1967  2 Sheets-Sheet 2

INVENTOR.
JOHN C. RENFRO
BY
ATTORNEY

United States Patent Office 3,537,836
Patented Nov. 3, 1970

3,537,836
OXIDIZER FOR MAKING HUMUS
John C. Renfro, 48 Doheny Park Village, 34202 Del
Obispo, Dana Point, Calif. 92629
Filed July 27, 1967, Ser. No. 656,479
Int. Cl. C05f 11/02
U.S. Cl. 71—24                               2 Claims

ABSTRACT OF THE DISCLOSURE

In the manufacture of humus the various live soil microorganisms are required to have proper working conditions, which conditions are provided in the oxidizer structures. The oxidizer structures are foraminated to permit the respiration of the microorganisms. The oxidizer basket, therefore, must be ventilated and the pore spaces or holes must be kept in contact with the atmosphere.

---

An object of my invention is to provide a novel oxidizer for making humus which consists of a basket open at both the top and the bottom, and the sides of which are formed of a foraminous material to provide proper ventilation for the soil microorganims.

Another object of my invention is to provide a novel method whereby water vapor in the atmosphere is cooled, condensed, and reabsorbed to supply the soil microorganisms with sufficient moisture to continue the process of continuous oxidation by means of the metabolism of the microorganisms.

Still another object of my invention is to continuously change the water in its vapor form in the atmosphere to liquid form by continuously reducing the temperature of a flow of air through a means located below the surface of the ground, and so constructed that the structure adjacent to the flowing column of humid air will have a lower temperature than the air to thus reduce the temperature of the water vapor and cause condensation thereof.

Another object of my invention is to produce humus under anaerobic conditions by attacking and breaking down the raw materials and oxidizing the same by the aerobic microorganisms.

Other objcets, advantages and features of invention may appear from the accompanying drawings, the subjoined detailed description and the appended claims.

Figure 1:
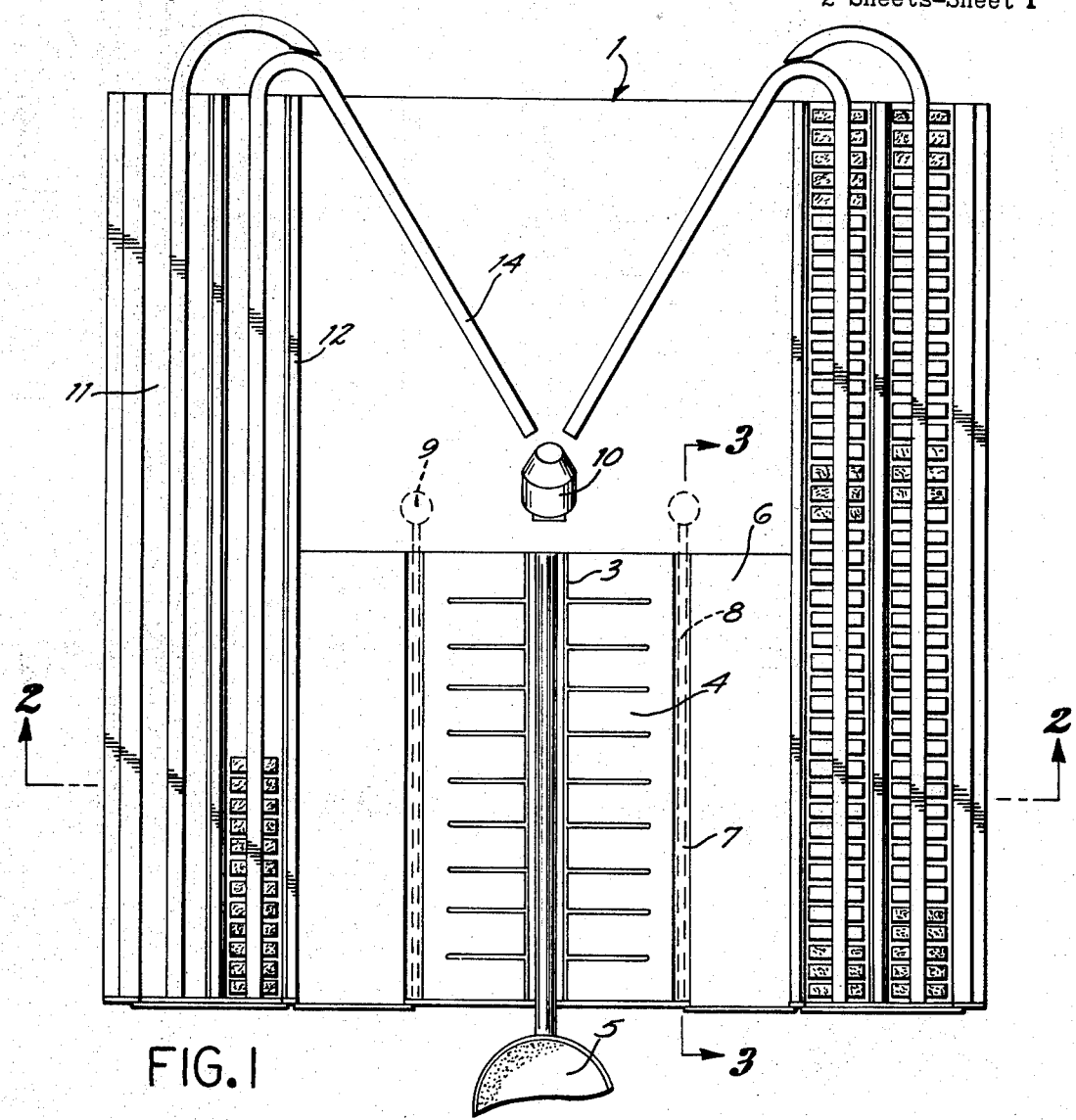
FIG. 1 is a plan view of the barn structure in which my method of making humus is carried out, and with the roof removed.
Figure 2:
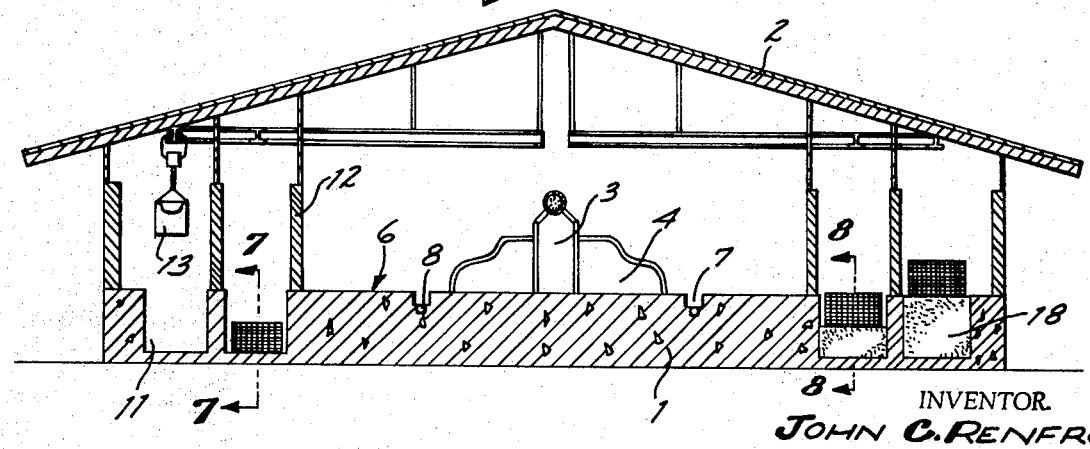
FIG. 2 is a sectional view taken on line 2—2 of FIG. 1.
Figure 3:
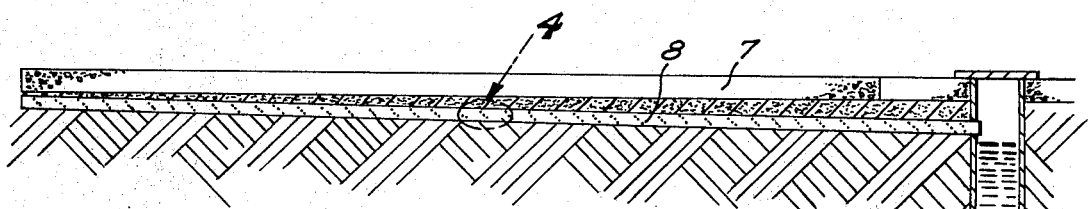
FIG. 3 is a vertical sectional view taken on line 3—3 of FIG. 1.
Figure 4:
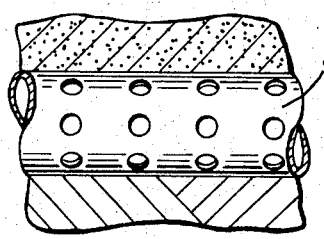
FIG. 4 is an enlarged sectional view taken in the area indicated by the numeral 4 in FIG. 3.
Figure 6:
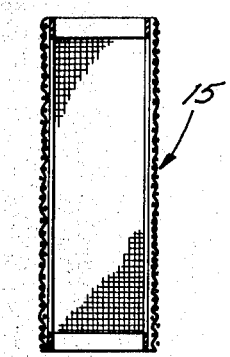
FIG. 6 is a sectional view taken on line 6—6 of FIG. 5.
Figure 5:
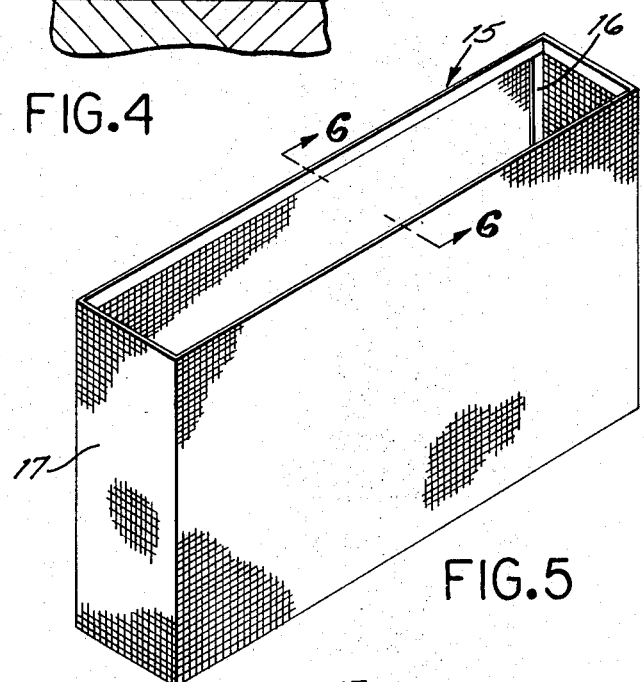
FIG. 5 is a perspective view of the oxidizer or oxidizer basket.
Figure 7:
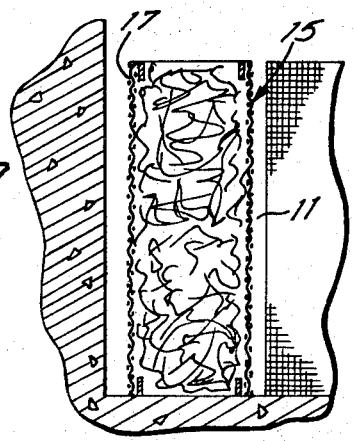
FIG. 7 is an enlarged sectional view taken on line 7—7 of FIG. 2.

As an illustration of my method of making humus, a barn or covered barnyard 1 is provided of a sufficient size to house an appreciable number of domestic animals or fowl, such as horses, cows, sheep, and the like. The barnyard is covered by a roof 2 which will protect the animals, and also prevent excessive moisture due to rain from falling on the enclosed area. Humus is manufactured by various live soil microorganisms. In addition to having the proper raw materials, these living microorganisms require proper working conditions. The humus is produced in baskets having pore spaces, and these spaces enable oxygen in sufficient quantities to be provided to the soil microorganisms for their respiration. The natural by-products of the reaction of the soil microorganisms consists of carbon dioxide, ammonia, and water-vapor. To maintain the oxygen supply and to reduce the amount of carbon dioxide, the pore spaces must be kept in contact with the atmosphere, that is, the oxidizer basket to be subsequently described must be ventilated. If the proper ventilation is not provided in the oxidizer baskets, then the anaerobic microorganisms take command. The natural by-product of their reaction consists of methane gas, putrefaction, and foul odors. The synthesis of humus can proceed under anaerobic conditions only after the raw materials have first been attacked, broken down, and oxidized by the aerobic microorganisms. The barn 1 is provided with a feed trough 3 and a plurality of stalls 4, arranged on one or both sides of the feed trough 3. These stalls each accommodate a domestic animal while it is feeding. The feed for the animals can be distributed from a silo 5, of usual and well known construction, if desired. A space 6 is provided back of the stalls 4 and within the barn or enclosure to enable the animals to exercise at will. At the rear of the stalls 4 and extending parallel to the group of stalls, I provide a trench 7 in the bottom of which a perforated pipe 8 is placed. This pipe collects urine and deposits the same in a basin 9 where it is collected for subsequent use. A mixer 10 is provided at the end of the row of stalls 4, substantially as shown in FIG. 1, and this mixer will permit various products, both vegetable and animal, to be properly broken up or divided and properly mixed for subsequent use in the humus producing areas.

Within the barn 1 and running lengthwise thereof, I provide one or more deep troughs or trenches 11, which are termed humus producing areas. A vertical wall 12 is provided between the stock area 6 and the trench 11 to prevent the animals from accidentally falling into the trench. The offal of the animals, including urine and other vegetable products, are gathered and mixed in the mixer 10, and are then distributed in suitable baskets 13 on tracks 14. These tracks extend from the mixer 10 and thence from the length of the trough or ditch 11 and are deposited in the trough or ditch where commercial humus is produced.

A plurality of oxidizer containers or baskets 15 are positioned within the trough or trench 11, and these baskets or oxidizers are positioned adjacent to each other, substantially as shown in FIG. 1. The oxidizer baskets are relatively large structures, approximately five feet wide, three feet high, and one foot in thickness, and consists of a rectangular metal frame 16 to which a foraminated or screen-like material 17 is secured. The oxidizer is open at both the top and the bottom, but the sides are formed by the hardware cloth or screen 17, as shown. The openings in the screen 17 are approximately ¼ inch in size, which will provide an ample amount of air to be admitted to the humus material, and also will prevent the fragmented material from dropping out of the baskets. The oxidizer baskets 15 are thus designed to hold the microorganisms and the necessary raw materials for the synthesis of humus, but also will provide sufficient moisture and air to insure immediate and continuous oxidation without additional care and attention. The humid air within the barn 1 will thus flow into the troughs or trenches 11 which are at a lower temperature, since they are below ground level and will, therefore, cause condensation of water vapor and humid air which are required for the proper working conditions of the microorganisms. The microorganisms thus supplied with sufficient moisture will continue the process of producing humus by means of their own metabolism. The rectangular oxidizer baskets 15 which retain the raw materials which are ground, shredded, chopped, or the like, so that when these materials are mixed the surface area of the materials are surrounded and mixed with air, moisture, and other raw materials. Thus the process of producing humus is continuous and requires no further manipulation other than to remove the completed humus from the trenches 11 onto a suitable loader, such as a skiploader and then distributed on the land.

Figure 8:
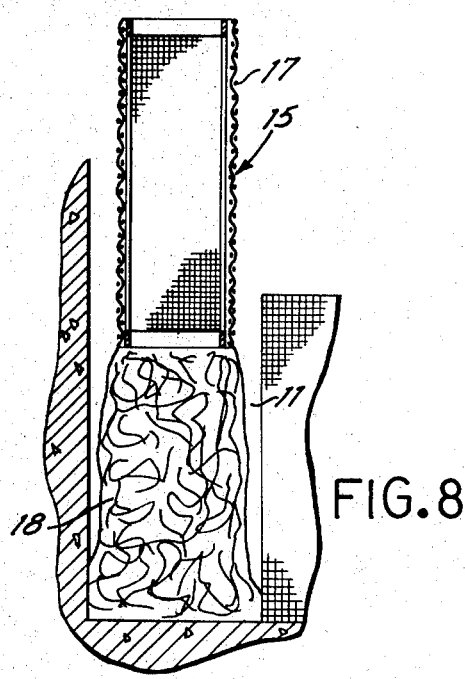
FIG. 8 is a transverse sectional view taken on line 8—8 of FIG. 2.

When a layer of humus has been produced, such as 18, in one or more of the trenches 11 the oxidizer baskets 15 can be raised, as shown in FIG. 8, and refilled thus enabling the trenches to be efficiently filled from top to bottom, and enabling the humus producing process to continue over an appreciable period of time and resulting in a final production of large quantities of humus.

Representative samples of my humus have been chemically analyzed with the following results:

| | pH | Salinity X10³ | Nitrogen as NO₃, p.p.m. | Phosphorus, p.p.m. | Potassium, p.p.m. | Organic (as humus) percent |
|---|---|---|---|---|---|---|
| Sample: | | | | | | |
| 1 | 7.1 | 6.90 | 0.6 | 3.2 | 94 | 25.60 |
| 2 | 7.4 | 5.20 | 1.2 | 4.0 | 90 | 33.00 |
| 3 | 7.5 | 5.60 | 1.4 | 4.2 | 190 | 30.00 |
| 4 | 7.2 | 5.40 | 1.2 | 4.4 | 70 | 27.25 |
| 5 | 7.9 | 7.20 | 1.4 | 4.7 | 800 | 28.60 |

Having described my invention, I claim:

1. The method of rapidly forming humus in an enclosure containing animals, fowl and the like, said enclosure and the animals therein enhancing the creation of required temperature and humidity conditions consisting of, first placing oxidizer containers within the enclosure and adjacent to the animals therein, then filling the oxidizer containers with a mixture of manure, urine and vegetable matter, said oxidizer containers having openings in the wall thereof to permit circulation of humid air around the mixture within the containers to provide required water for the humus making process.

2. The method of making humus as recited in claim 1, and said oxidizer containers being open at the top and bottom, and the sides thereof being formed of a foraminous material.

References Cited

UNITED STATES PATENTS 2,285,834 6/1942 Proctor _____ 71—9
3,138,449 6/1964 Renfro _____ 71—24
3,165,394 1/1965 Rausing _____ 71—24 X REUBEN FRIEDMAN, Primary Examiner C. N. HART, Assistant Examiner